United States Patent
Watanabe et al.

(10) Patent No.: US 11,383,810 B2
(45) Date of Patent: Jul. 12, 2022

(54) COOLING DEVICE FOR POWER SOURCE FOR SHIP PROPULSION DEVICE

(71) Applicant: SUZUKI MOTOR CORPORATION, Hamamatsu (JP)

(72) Inventors: Toshio Watanabe, Hamamatsu (JP); Jun Ito, Hamamatsu (JP); Shingo Matsumoto, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/327,510

(22) Filed: May 21, 2021

(65) Prior Publication Data

US 2021/0371071 A1 Dec. 2, 2021

(30) Foreign Application Priority Data

May 29, 2020 (JP) .............................. JP2020-093933

(51) Int. Cl.
*B63H 20/28* (2006.01)
*F01P 7/14* (2006.01)
(Continued)

(52) U.S. Cl.
CPC .............. *B63H 20/28* (2013.01); *B01D 29/11* (2013.01); *B01D 35/147* (2013.01); *B01D 35/1435* (2013.01); *B01D 53/94* (2013.01); *F01N 3/24* (2013.01); *F01P 5/10* (2013.01); *F01P 7/14* (2013.01); *F01P 11/06* (2013.01); *F01P 11/14* (2013.01); *B01D 2201/306* (2013.01); *F01P 2007/146* (2013.01)

(58) Field of Classification Search
CPC ........ B01D 46/10; B63B 34/40; B63H 21/14; B63H 20/28; B63H 20/285; F01P 3/202; F01P 11/06; F01P 11/12
See application file for complete search history.

(56) References Cited

U.S. PATENT DOCUMENTS 3,409,135 A * 11/1968 Bradley ................. B01D 35/02
  210/136
4,032,453 A * 6/1977 Redone .................... B63J 4/006
  210/291

(Continued)

FOREIGN PATENT DOCUMENTS

JP  S 61-184198 A  8/1986
JP  2003-063497    3/2003

*Primary Examiner* — Long T Tran
(74) *Attorney, Agent, or Firm* — Stein IP, LLC

(57) ABSTRACT

The cooling device for a power source for a ship propulsion device that pumps up cooling water, from which foreign matters with sizes that cause clogging of a cooling water route have been removed, supplies the cooling water to a cooling water passage (30), and discharges the cooling water to outside after cooling a power source (10) includes: a filtration device (40, 40A, 40B) provided in the cooling water route to filtrate foreign matters remaining in the cooling water, and the filtration device is of a cartridge type that incorporates a filter (45, 72) for filtration disposed in a main water passage (P1) and a valve member (46, 66) configured to open and close a bypass water passage (P2) and that is configured such that in a case in which clogging occurs in the filter, the valve member opens to cause the cooling water to flow via the bypass water passage.

9 Claims, 8 Drawing Sheets

(51) Int. Cl.

*F01N 3/24* (2006.01)
*F01P 5/10* (2006.01)
*F01P 11/14* (2006.01)
*B01D 35/147* (2006.01)
*B01D 35/143* (2006.01)
*B01D 29/11* (2006.01)
*B01D 53/94* (2006.01)
*F01P 11/06* (2006.01)

(56) References Cited

U.S. PATENT DOCUMENTS

| | | | | |
|---|---|---|---|---|
| 5,089,129 | A * | 2/1992 | Brigman | B03C 1/288 |
| | | | | 210/541 |
| 8,133,087 | B1 * | 3/2012 | Abou Zeid | B63H 20/28 |
| | | | | 440/88 L |
| 2002/0182949 | A1 * | 12/2002 | Tanaka | B63H 21/383 |
| | | | | 440/88 M |
| 2003/0040231 | A1 | 2/2003 | Matsuda et al. | 440/39 |
| 2003/0121253 | A1 * | 7/2003 | Ford | F01N 3/021 |
| | | | | 60/310 |
| 2009/0298365 | A1 * | 12/2009 | Kato | F02M 37/20 |
| | | | | 123/445 |
| 2014/0042062 | A1 * | 2/2014 | DaCosta | B63J 4/002 |
| | | | | 210/153 |
| 2014/0291261 | A1 * | 10/2014 | Yee | B63J 4/002 |
| | | | | 210/791 |

* cited by examiner

COOLING DEVICE FOR POWER SOURCE FOR SHIP PROPULSION DEVICE

CROSS-REFERENCE TO RELATED APPLICATIONS

This application claims the benefit of Japanese Application No. 2020-093933, filed May 29, 2020, in the Japanese Patent Office. All disclosures of the document named above are incorporated herein by reference.

BACKGROUND OF THE INVENTION

Field of the Invention

The present invention relates to a cooling device for a power source for a ship propulsion device.

Description of the Related Art

In recent years, contamination of water areas such as oceans, lakes, and rivers due to trash has been a serious environmental problem, and measures for collecting trash from water areas have been required. In general, it is more difficult to collect smaller trash. Particularly, it is difficult to capture fine microplastics (with sizes of 5 mm or less, for example), microplastics have large influences on aquatic life and large loads on the environment. Therefore, it has been desired to actively collect the microplastics.

Cooling devices of a water cooling type to cool engines and electric motors, which are power sources for ship propulsion devices, take water pumped up from underwater into cooling water passages, use the water as cooling water, and discharge the cooling water after cooling heat generating parts of the power sources to the outside. However, existing cooling devices are adapted just to return the cooling water pumped up once to the outside as it is, and a viewpoint (environmental measure) of purifying the pumped cooling water has been missed.

According to a cooling device for a power source for a ship propulsion device, a porous strainer or the like that serves as a trash removal means is provided at or near an inlet port through which cooling water is taken from the outside (Japanese Patent Laid-Open No. 61-184198, for example), such that large trash such as caps of PET bottles is prevented from entering a cooling water passage by the strainer. However, there is a high likelihood that fine foreign matters with sizes (of about 1 mm to 2 mm, for example) below the size of a strainer mesh are taken into the cooling water passage as they are without being removed, depending on the strainer. Therefore, opportunities for purification have been missed without capturing microplastics and the like that are difficult to be collected.

Also, there are examples in which a filter is provided in a cooling water passage as in Japanese Patent Laid-Open No. 2003-63497, but an object of the filter is to remove relatively large foreign matters such as pebbles and algae, and the filter has functions similar to those of the strainer according to Japanese Patent Laid-Open No. 61-184198.

As described above, there have been no viewpoints of actively carrying out environmental measures on cooling water that cooling devices for power sources for ship propulsion devices in the related art take from outside. With a configuration in which a strainer is provided at an inlet port as in Japanese Patent Laid-Open No. 61-184198, for example, fine objects that have passed through the strainer are not collected and return to water again even if passing of such fine objects is regulated by making the mesh of the strainer finer.

Even if environment contaminating materials in cooling water taken from the outside are captured and removed, sacrifice of power performance of the ship propulsion devices and addition of expensive and complicated devices lead to degradation of product values of the ship propulsion devices, and it is not possible to state that these are practical measures.

If clogging of a filter incorporated in a cooling water passage occurs in a cooling device as in Japanese Patent Laid-Open No. 2003-63497, for example, a flow of the cooling water is disturbed, cooling performance deteriorates, and output degradation or overheating of a power source may occur. Also, there is a concern that if the filter is just assembled in the cooling water passage, the cooling device may require extensive disassembly and maintenance when clogging of the filter occurs.

In a case in which the ship propulsion device is an outboard motor, and if the outboard motor increases in size due to addition of a device for collecting environment contaminating materials from cooling water, there is a problem that multiple-machine arrangement in which a plurality of outboard motors are disposed in an aligned manner is limited.

SUMMARY OF THE INVENTION

The present invention was made in view of such points, and provides a cooling device for a power source for a ship propulsion device capable of collecting environment contaminating materials such as microplastics that are present in water and efficiently removing the environment contaminating material with a simple configuration with no sacrifice of power performance.

According to the present invention, there is provided a cooling device for a power source for a ship propulsion device including: a cooling water route that supplies water pumped up from underwater to a cooling water passage to cool a power source and discharges cooling water after the cooling from the cooling water passage to outside, foreign matters with sizes that cause clogging of the cooling water route having been removed from the cooling water flowing through the cooling water route; and a filtration device that is provided in the cooling water route to filtrate foreign matters remaining in the cooling water, in which the filtration device is of a cartridge type that incorporates a filter for filtration disposed in a main water passage and a valve member configured to open and close a bypass water passage and that is configured such that in a case in which clogging occurs in the filter, the valve member opens to cause the cooling water to flow via the bypass water passage.

According to the cooling device for a power source for a ship propulsion device of the present invention, it is possible to collect environment contaminating materials such as microplastics that are present in water and to efficiently remove the environment contaminating materials, with a simple configuration with no sacrifice of power performance.

The present disclosure relates to subject matter contained in Japanese Patent Application No. 2020-093933 (filed on May 29, 2020) which is expressly incorporated herein by reference in its entirety.

DETAILED DESCRIPTION OF THE PREFERRED EMBODIMENT

Hereinafter, an embodiment of the present invention will be described with reference to the accompanying drawings. The present embodiment is applied to an outboard motor that is an example of a ship propulsion device. Each of front, back, left, right, up, and down in the following description indicates each direction from a ship body of a ship to which the outboard motor is attached. The left-right direction is a transverse width direction of the outboard motor. Note that although the orientation of the outboard motor relative to the ship body changes due to swinging around a steering axis or swinging around a tilt axis, each direction will be described below on the assumption that the outboard motor is at a constant location (a location in an initial state with no swinging due to steering or tilting) relative to the ship body.

Figure 1:
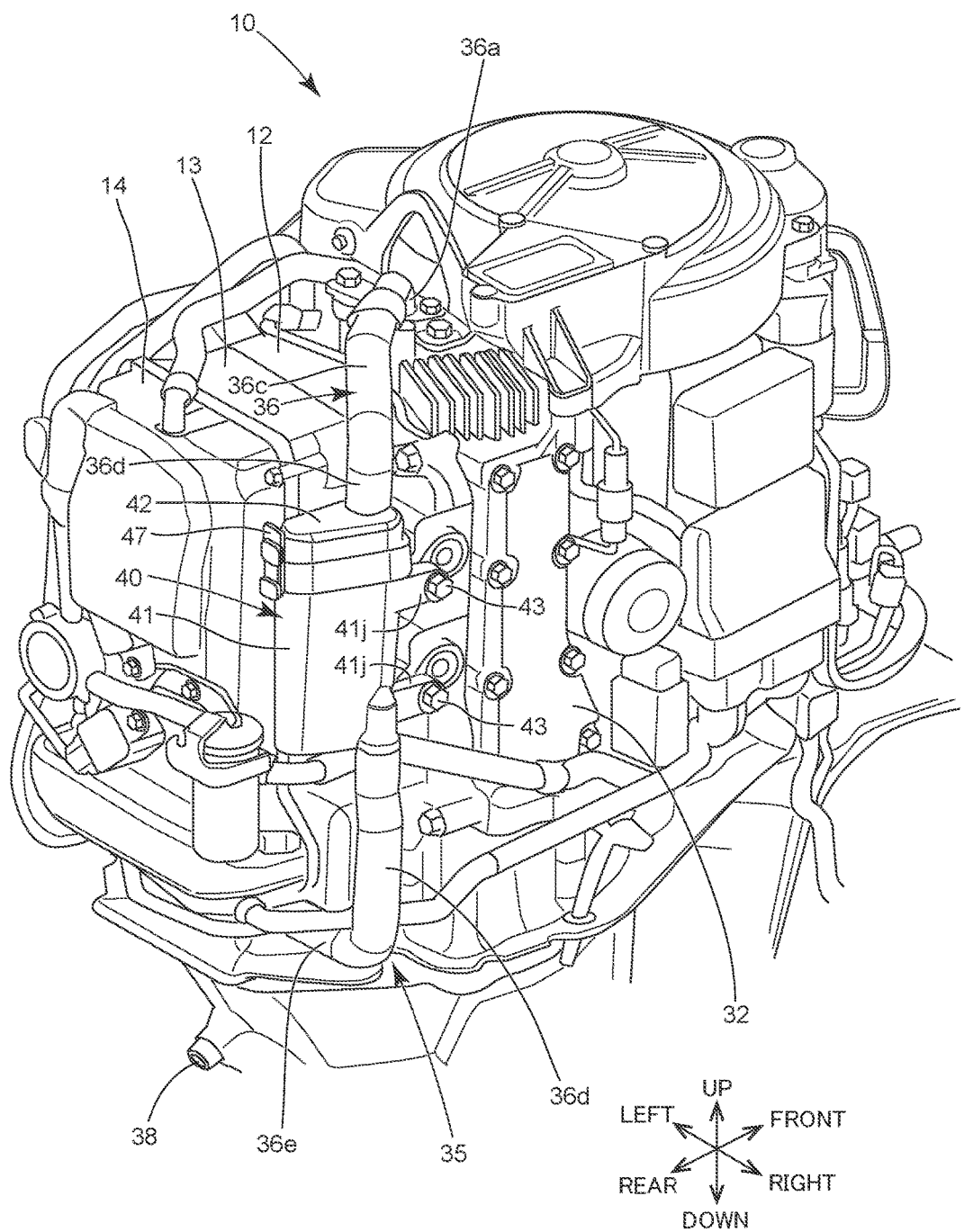
FIG. 1 is a perspective view of an engine and a cooling device for an outboard motor according to an embodiment.
Figure 2:
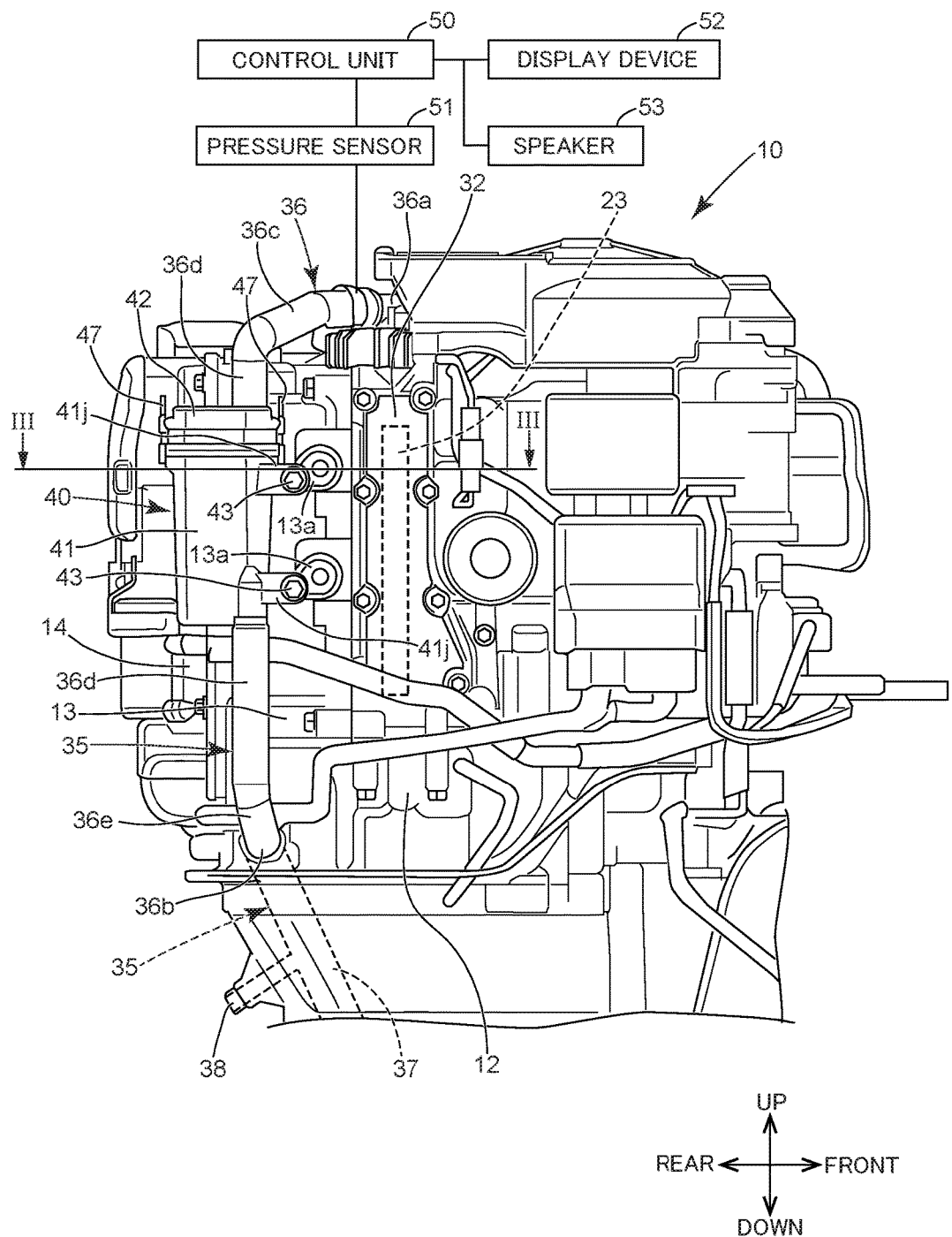
FIG. 2 is a side view of the engine and the cooling device for the outboard motor.

FIGS. 1 and 2 illustrate an engine 10 that is a power source of an outboard motor. The engine 10 is attached to an engine room in an engine case 11 (partially illustrated in FIG. 3) configuring an exterior of the outboard motor. Although illustration of power systems other than the engine 10 in the outboard motor is omitted, a drive shaft which is driven and rotated by a force generated by the engine 10 extends in the up-down direction, a propeller shaft to which the rotation is transmitted from the drive shaft extends in the front-back direction, and a propulsion force is generated through rotation of a propeller attached to the propeller shaft.

The outboard motor roughly includes an upper unit including the engine 10, a lower unit including the propeller and the propeller shaft, and an intermediate unit placed between the upper unit and the lower unit. The lower unit is located below a water level in an ordinary cruising state. The drive shaft is caused to pass inside the intermediate unit and connects a crankshaft (not illustrated) on the side of the upper unit and the propeller shaft (not illustrated) on the side of the lower unit. The lower unit is provided with a gear that transmits power from the drive shaft to the propeller shaft, and a gear case (not illustrated) surrounding the gear configures the exterior of the lower unit.

Figure 3:
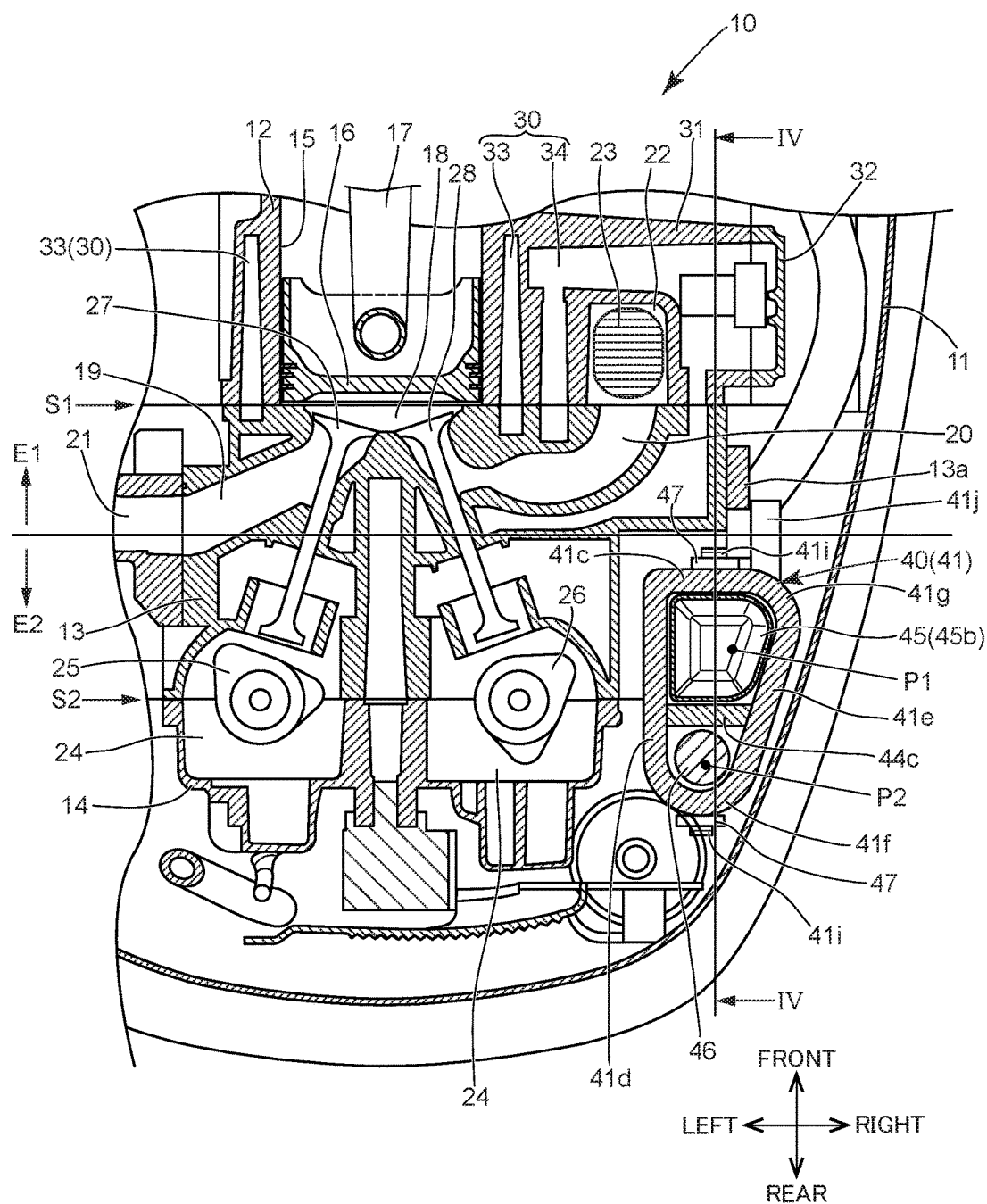
FIG. 3 is a sectional view taken along the line III-III in FIG. 2.

As illustrated in FIGS. 1 to 4, the engine 10 has a cylinder block 12, a cylinder head 13, and a head cover 14. The cylinder head 13 is disposed behind the cylinder block 12, and the head cover 14 is disposed behind the cylinder head 13. The positions of a mating surface 51 that is a boundary between the cylinder block 12 and the cylinder head 13 and a mating surface S2 that is a boundary between the cylinder head 13 and the head cover 14 are illustrated in FIG. 3. Although not illustrated in FIG. 3, a crankcase is disposed in front of the cylinder block 12. A crankshaft (not illustrated) extending in the up-down direction is provided in the crankcase.

As illustrated in FIG. 3, tubular cylinders 15 are formed inside the cylinder block 12. The plurality of cylinders 15 are provided at different positions in the up-down direction. In other words, the engine 10 is a multi-cylinder engine in which the cylinders 15 are aligned in the up-down direction, and a plurality of intake and exhaust ports and valves, which will be described later, are also provided in a manner corresponding to the number of cylinders 15.

A piston 16 is inserted into each cylinder 15 such that the piston 16 can slide in the front-back direction. The piston 16 is coupled to the crankshaft inside the crankcase via a connecting rod 17. If the piston 16 moves forward and backward in the front-back direction, then the crankshaft rotates. The rotation of the crankshaft is transmitted to the drive shaft, and the propeller is driven and rotated via the drive shaft and the propeller shaft as described above.

The cylinder head 13 is provided with a combustion chamber 18 that communicates with each cylinder 15 and an intake port 19 and an exhaust port 20 that communicate with the combustion chamber 18. The intake port 19 extends substantially leftward relative to the combustion chamber 18, and the exhaust port 20 extends substantially rightward relative to the combustion chamber 18. An intake conduit line 21 is connected to the intake port 19. The exhaust port 20 has a curved shape extending on the obliquely right and rear side from the combustion chamber 18 and changing an orientation toward the obliquely right front side at a midpoint, and a distal end portion (an end portion on a side opposite to the side on which the exhaust port 20 communicates with the combustion chamber 18) of the exhaust port 20 is connected to the exhaust conduit line 22. The exhaust conduit line 22 is located on the right side of the cylinder 15 and extends in the up-down direction, and a plurality of exhaust ports 20 corresponding to the plurality of cylinders 15 are connected to a common exhaust conduit line 22. A catalyst 23 is disposed in the exhaust conduit line 22 (see FIGS. 2 and 3). The catalyst 23 has a shape with a longitudinal direction oriented in the up-down direction along the exhaust conduit line 22.

Intake camshafts 25 and exhaust camshafts 26 that are rotatable about shafts extending in the up-down direction are supported in left and right valve operating chambers 24 formed between the cylinder head 13 and the head cover 14. The intake camshafts 25 are located behind the intake port 19, and the exhaust camshafts 26 are located behind the exhaust port 20. A portion of the intake port 19 communicating with the combustion chamber 18 is opened and closed by an intake valve 27. Opening and closing of the intake valve 27 are controlled by a cam provided at the intake camshaft 25. A portion of the exhaust port 20 communicating with the combustion chamber 18 is opened and closed by an exhaust valve 28. Opening and closing of the exhaust valve 28 are controlled by a cam provided at the exhaust camshaft 26.

Air taken from the outside of the outboard motor passes through a silencer (not illustrated) and then flows into the intake port 19 through the intake conduit line 21. A fuel is jetted into the intake port 19 by a fuel injector (not illustrated), and mixture gas (air-fuel mixture) is generated from the air flowing into the intake port 19 and the fuel jetted into the intake port 19. The mixture gas flows into the combustion chamber 18 through opening of the intake valve 27. Note that the engine may be of a type adapted such that the fuel is jetted from the fuel injector into the combustion chamber 18 to generate the mixture gas.

If mixture gas inside the combustion chamber 18 is ignited at a predetermined timing by an ignition plug (not illustrated), then the piston 16 is pressed and moves forward due to combustion of the mixture gas, and a force that causes the crankshaft to rotate is transmitted via the connecting rod 17. Exhaust gas after combustion flows out of the combustion chamber 18 to the exhaust port 20 through opening of the exhaust valve 28 and advances to the exhaust conduit line 22. The exhaust conduit line 22 is connected to a lower exhaust pipe (not illustrated) extending downward from an engine room. The exhaust gas purified by the catalyst 23 inside the exhaust conduit line 22 passes through the lower exhaust pipe and is then discharged from an exhaust port (not illustrated) to the outside of the outboard motor. The exhaust port is provided at the lower unit of the outboard motor, such as a rear end portion of the propeller shaft, and the exhaust gas is discharged to the underwater.

The engine 10 includes a water cooling-type cooling device. The cooling device is adapted to pump up water in the water area of cruising and use the taken water as cooling water to cool the engine 10. As illustrated in FIG. 3, a cooling water passage 30 through which the cooling water is caused to pass is formed in the surroundings of a heat generating part of the engine 10 that reaches a high temperature. The cooling water passage 30 is configured as a water passage with a watertight structure by a water jacket 31 formed by a part of the cylinder block 12 and the cylinder head 13 and a water jacket cover 32 attached to the water jacket 31.

An inlet-side water passage (not illustrated) for taking the cooling water from the outside of the outboard motor (underwater) and supplying the cooling water to the cooling water passage 30 and a water discharge-side water passage 35 for discharging the cooling water after cooling the engine 10 from the cooling water passage 30 to the outside are provided. The inlet-side water passage, the cooling water passage 30, and the water discharge-side water passage 35 configure the cooling water route in the cooling device. A water pump (not illustrated) driven by rotation of the drive shaft is used to pump up the cooling water from the outside via the inlet-side water passage, distribute the cooling water through the cooling water passage 30, and discharge the cooling water via the water discharge-side water passage 35.

The inlet-side water passage includes, on a most upstream side, a water inlet port (not illustrated) that is opened on an outer surface side of the outboard motor. The water inlet port is formed in an outer surface of the lower unit (an outer surface of the gear case) of the outboard motor. The water inlet port is provided with a strainer (not illustrated), and foreign matters with sizes in such a level that causes clogging of the cooling water route, such as pebbles and algae, are prevented from entering the cooling water route by the strainer. The inlet-side water passage extends from the water inlet port to the inside of the engine room and is connected to the cooling water passage 30. The cooling water taken into the inlet-side water passage from the water inlet port is suctioned and fed to the inside of the cooling water passage 30 through driving of the water pump.

The cooling water passage 30 includes a cylinder surrounding water passage 33 formed in the surroundings of the cylinders 15 and the combustion chamber 18, and an exhaust surrounding water passage 34 formed in the surroundings of the exhaust port 20 and the exhaust conduit line 22. The cooling water supplied to the cylinder surrounding water passage 33 and the exhaust surrounding water passage 34 takes heat from and cools a portion that has reached a high temperature due to combustion of the mixture gas in the combustion chamber 18 and passing of the exhaust gas after combustion.

As illustrated in FIGS. 1 and 2, the water discharge-side water passage 35 includes a water discharge hose 36 and a lower water discharge conduit line 37. An upstream-side end portion 36a, which is one end of the water discharge hose 36, is connected to the cooling water passage 30 on the upper surface side of the cylinder block 12. A downstream-side end portion 36b, which is the other end of the water discharge hose 36, is connected to the lower water discharge conduit line 37 below the cylinder head 13 and the head cover 14. The lower water discharge conduit line 37 extends downward from the engine room.

The water discharge hose 36 has an upper pipe portion 36c extending from the upstream-side end portion 36a to the obliquely right rear side, an up-down direction pipe portion 36d bent from the upper pipe portion 36c and extending downward, and a lower pipe portion 36e bent from the lower end of the up-down direction pipe portion 36d to the left side and extending up to the downstream-side end portion 36b. The up-down direction pipe portion 36d passes on the right side of the cylinder head 13 and the head cover 14.

More specifically, as illustrated in FIG. 3, a front area E1 where the cylinders 15, the combustion chamber 18, the intake port 19, the exhaust port 20, and the like are provided within the range of the engine 10 in the front-back direction has a wide width in the left-right direction due to the shapes of the intake port 19 and the exhaust port 20 extending in the left-right direction, installation of the exhaust conduit line 22 on a side (right side) of the cylinders 15, a space for the cooling water passage 30, and the like. On the contrary, a rear area E2 including the valve operating chambers 24 within the range of the engine 10 in the front-back direction has a narrow width in the left-right direction. The up-down direction pipe portion 36d of the water discharge hose 36 is disposed in the rear area E2 and passes behind the exhaust conduit line 22 and the cooling water passage 30 (particularly, the exhaust surrounding water passage 34) and on the right side of the valve operating chambers 24.

A water discharge port (not illustrated) that is opened on the outer surface side of the outboard motor is formed on the most downstream side of the water discharge-side water passage 35. The water discharge port is provided at the lower unit (near the rear end portion of the propeller shaft or the like), and an end portion of the lower water discharge conduit line 37 is connected to the water discharge port.

A control valve (not illustrated) that is opened and closed in accordance with a change in water temperature of the cooling water is provided between the cooling water passage 30 and the water discharge-side water passage 35 (water discharge hose 36). In a state in which the cooling water temperature in the cooling water passage 30 is low, the control valve is closed, does not allow the water to be discharged on the side of the water discharge-side water passage 35, and causes the cooling water to circulate inside the cooling water passage 30. If the cooling water temperature in the cooling water passage 30 increases, the control valve is opened, discharges the water on the side of the water discharge-side water passage 35, and takes cooling water at a low temperature from the inlet-side water passage. The cooling water fed to the water discharge-side water passage 35 passes through the water discharge hose 36 and the lower water discharge conduit line 37 and is discharged from the water discharge port to the outside (underwater). A part of the cooling water passing through the water discharge-side water passage 35 is released from a detection hole 38 provided at a midpoint (above the water level) of the lower water discharge conduit line 37, and a distribution condition of the cooling water through the cooling water route can be checked by observing the released state from the detection hole 38.

Figure 5:
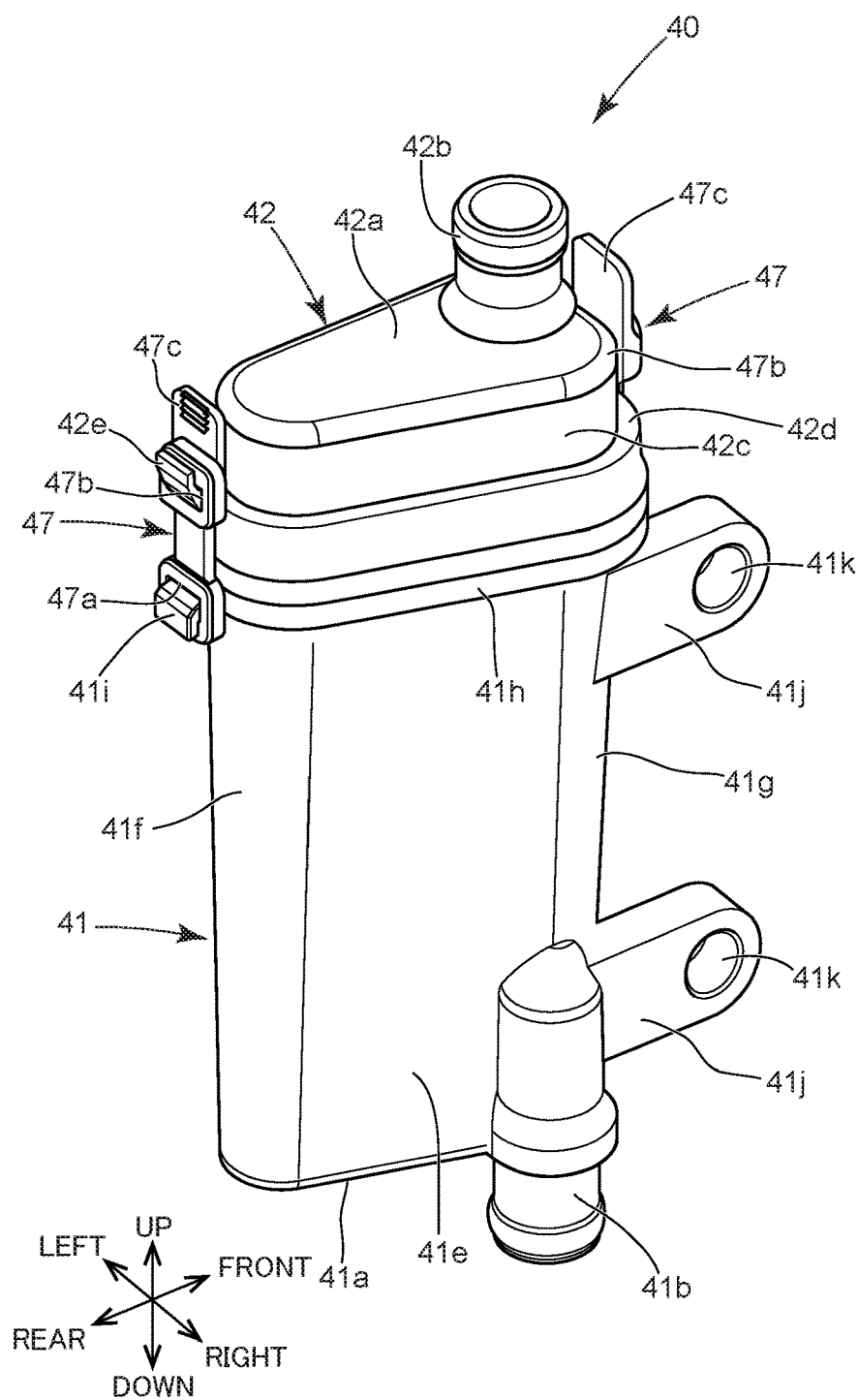
FIG. 5 is a perspective view of a filtration device.

Since relatively large foreign matters such as pebbles and algae are blocked by the strainer provided at the water inlet port of the inlet-side water passage as described above, the cooling water flowing through the cooling water route is water from which foreign matters with such sizes that cause clogging of the cooling water route have been removed. The cooling device according to the present embodiment includes, in the cooling water route, the filtration device 40 for filtrating and collecting yet finer foreign matters (environment contaminating materials, in particular) remaining in the cooling water as an environmental measure, in addition to securing of such cooling performance (smooth distribution of the cooling water). The filtration device 40 is a cartridge-type unit as illustrated in FIG. 5 and can be attached to and detached from a midpoint of the up-down direction pipe portion 36*d* of the water discharge hose 36. The filtration device 40 incorporates a filter 45 such as a mesh or a non-woven cloth that are finer than the strainer and can capture fine foreign matters remaining in the cooling water before the cooling water is discharged to the outside.

Referring mainly to FIGS. 3, 4, 5 and 6, a specific configuration of the filtration device 40 will be described. The filtration device 40 has a columnar shape (square tubular shape) that is long in the up-down direction and has a two-split structure including a body portion 41 and a lid portion 42. The lid portion 42 is attached to an upper portion of the body portion 41. Each of the body portion 41 and the lid portion 42 is formed of metal, a synthetic resin, or the like and has corrosion resistance against seawater.

Figure 4:
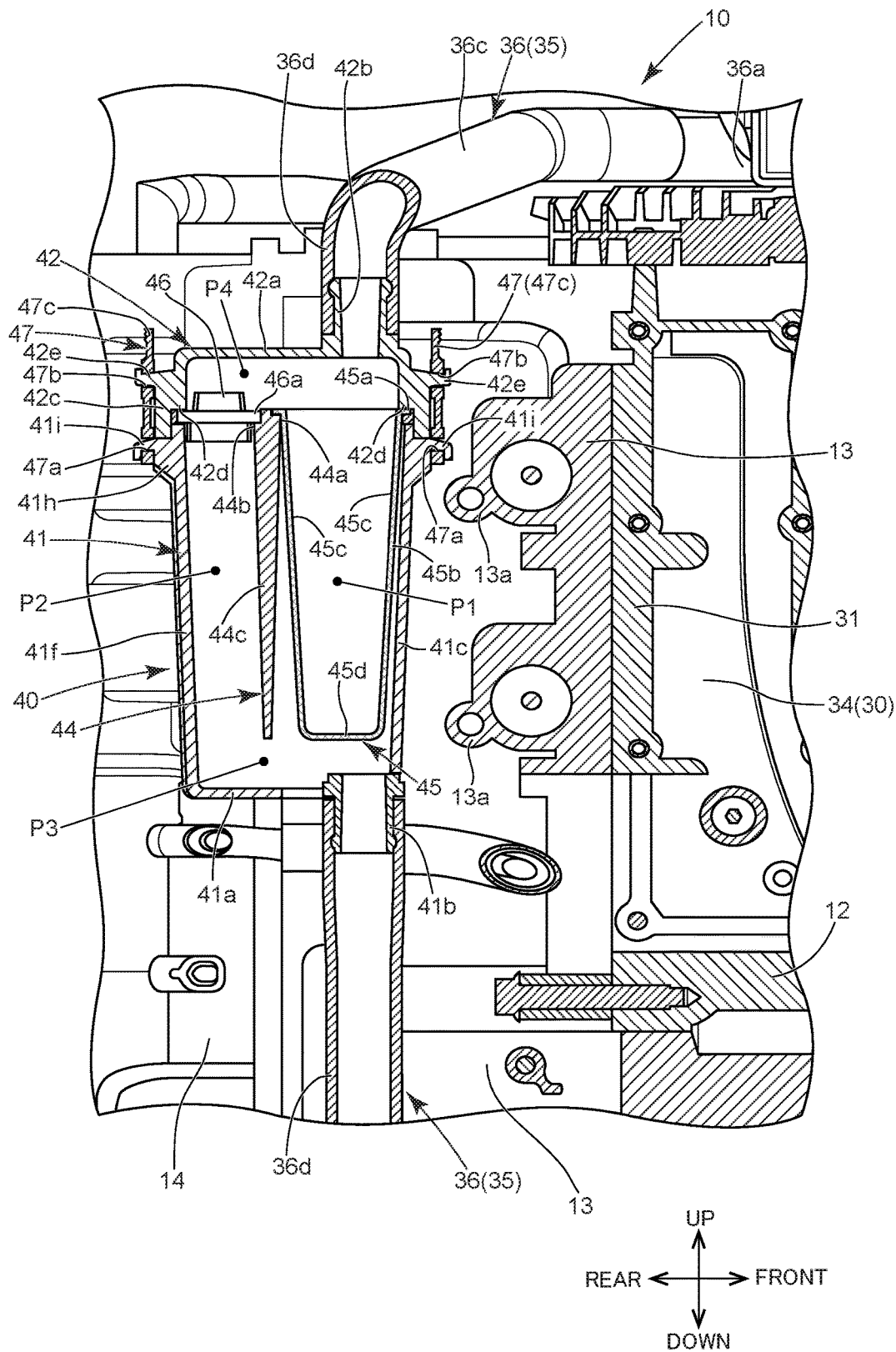
FIG. 4 is a sectional view taken along the line IV-IV in FIG. 3.

The up-down direction pipe portion 36*d* of the water discharge hose 36 is split into an upper half portion located on the upstream side and a lower half portion located on the downstream side. An end portion of the upper half portion of the up-down direction pipe portion 36*d* is connected to an entrance tubular portion 42*b* projecting upward from an upper wall 42*a* of the lid portion 42. An end portion of the lower half portion of the up-down direction pipe portion 36*d* is connected to an exit tubular portion 41*b* projecting downward from a bottom wall 41*a* of the body portion 41. These connecting portions have fitting shapes with recessed and projecting shapes, such that the entrance tubular portion 42*b* and the exit tubular portion 41*b* are prevented from dropping from the water discharge hose 36 through the fitting (see FIG. 4). As illustrated in FIG. 4, the entrance tubular portion 42*b* and the exit tubular portion 41*b* have a relationship in which the entrance tubular portion 42*b* and the exit tubular portion 41*b* are aligned in the up-down direction (that is, the mutual positions in the front-back direction and the left-right direction are substantially the same).

The body portion 41 has, as side walls extending upward from the bottom wall 41*a*, a front-side wall 41*c*, a left-side wall 41*d*, a right-side wall 41*e*, and a rear-side wall 41*f*. The front-side wall 41*c* has a wall portion with a planar shape extending in the left-right direction in a plan view (a sectional view as in FIG. 3), the left-side wall 41*d* is a wall portion with a planar shape extending in the front-back direction in a plan view, and the front-side wall 41*c* and the left-side wall 41*d* are in a substantially perpendicular relationship. The right-side wall 41*e* has a wall portion with a planar shape with an interval from the left-side wall 41*d* (the distance in the left-right direction) decreasing as it advances from the front side (front-side wall 41*c*) toward the rear side (rear-side wall 41*f*). The rear-side wall 41*f* has a wall portion, to which mutual rear end portions of the left-side wall 41*d* and the right-side wall 41*e* are connected, and which is curved to project toward the rear side. A corner portion between the front-side wall 41*c* and the right-side wall 41*e* forms a curved wall 41*g* with a smooth shape. In the following description, the front-side wall 41*c*, the left-side wall 41*d*, the right-side wall 41*e*, the rear-side wall 41*f*, and the curved wall 41*g* will be collectively referred to as "side walls" of the body portion 41.

In a plan view, the body portion 41 has a substantially triangular (wedge-like) shape with the front-side wall 41*c*, the left-side wall 41*d*, and the right-side wall 41*e* serving as three sides thereof (see FIG. 3). In other words, the body portion 41 has a substantially triangular shape with a wide width in the left-right direction on the front (front-side wall 41*c*) side and with a narrow width in the left-right direction on the rear (rear-side wall 41*f*) side.

Also, the body portion 41 has a longer length (the distance from the front-side wall 41*c* to the rear-side wall 41*f*) in the front-back direction than the maximum width (the width at the location of the front-side wall 41*c*) in the left-right direction and has a shape that is thin and long in the front-back direction. The length of the body portion 41 in the up-down direction is longer than the length thereof in the front-back direction. In other words, in a case in which the maximum width of the body portion 41 in the left-right direction is defined as X, the length thereof in the front-back direction is defined as Y, and the length thereof in the up-down direction is defined as Z, a relationship of $X<Y<Z$ is satisfied.

A flange portion 41*h* projecting laterally from the outer surfaces of the side walls is formed slightly below the upper end of the body portion 41. A pair of front and rear support projections 41*i* are provided at a front edge and a rear edge of the flange portion 41*h*. As illustrated in FIG. 4, each support projection 41*i* has a hook shape bent downward near the distal end thereof.

A pair of upper and lower fastening portions 41*j* project forward from the vicinity of the curved wall 41*g* from among the side walls of the body portion 41. The body portion 41 is secured to the cylinder head 13 (a main body portion of the engine 10) by a bolt 43 inserted into a through-hole 41*k* formed in each fastening portion 41*j* being screwed into and fastened to each of screw holes of a pair of fastening portions 13*a* provided on a right-side portion of the cylinder head 13.

Figure 6:
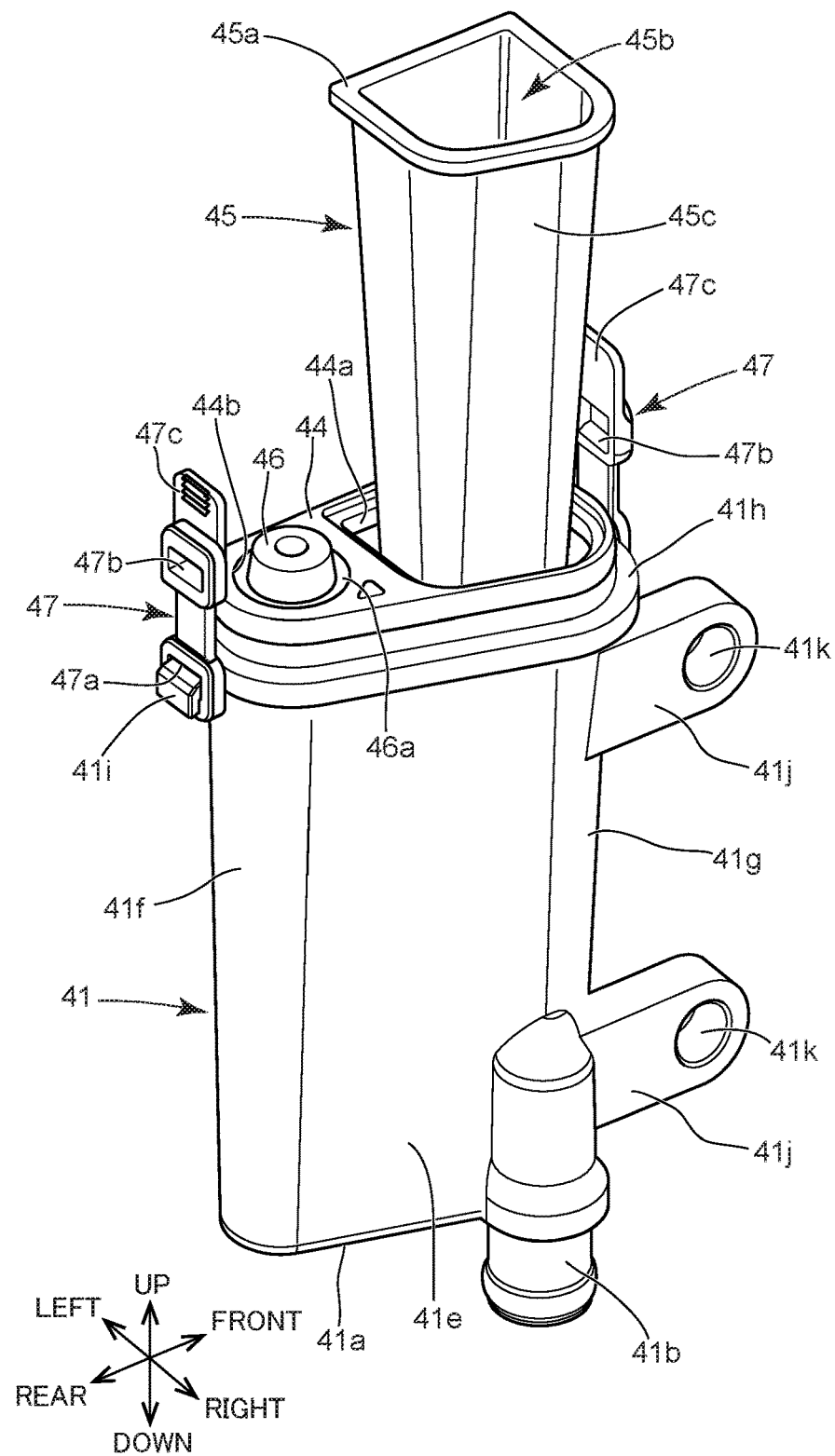
FIG. 6 is a perspective view of the filtration device without a lid.

The body portion 41 is opened on the upper end side, and a sealing member 44 is attached to cover the opened portion (see FIG. 6). The sealing member 44 is made of a material with non-permeability and flexibility, such as rubber. The shape of the outer peripheral portion of the sealing member 44 corresponds to the outer surface shape of the side walls of the body portion 41. The sealing member 44 has a first opening 44*a* and a second opening 44*b* penetrating in the up-down direction. A stepped portion opened upward is formed into an annular shape at a peripheral edge of each of the first opening 44*a* and the second opening 44*b*. The first opening 44*a* is provided on the front side, the second opening 44*b* is provided on the rear side, and a partition wall 44*c* (see FIG. 4) projecting downward is provided between the first opening 44*a* and the second opening 44*b*.

As illustrated in FIGS. 3 and 4, the inside of the body portion 41 is partitioned by the partition wall 44*c* into front and rear portions in a state in which the sealing member 44 is attached to the body portion 41. As a space (a space surrounded by the front-side wall 41*c*, the left-side wall 41*d*, the right-side wall 41*e*, and the partition wall 44*c*) on the front side of the partition wall 44c, a main water passage P1 is formed. As a space (a space surrounded by the rear-side wall 41f, the left-side wall 41d, the right-side wall 41e, and the partition wall 44c) on the rear side of the partition wall 44c, a bypass water passage P2 is formed. A lower end of the partition wall 44c is not connected to the bottom wall 41a, and a communication passage P3 that establishes communication between the main water passage P1 and the lower end portion of the bypass water passage P2 is formed between the partition wall 44c and the bottom wall 41a (see FIG. 4).

Similar to the up-down direction pipe portion 36d of the water discharge hose 36, the cooling water flows from the upper side toward the lower side in the filtration device 40. As illustrated in FIGS. 3 and 4, the main water passage P1 has a larger sectional area than the bypass water passage P2 in a direction perpendicular to the flow of the cooling water. Specifically, the main water passage P1 has a larger sectional area by the main water passage P1 being provided at a front-side portion with a larger interval in the left-right direction between the left-side wall 41d and the right-side wall 41e and by the partition wall 44c being located to be closer to the rear side beyond the center of the body portion 41 in the front-back direction.

The first opening 44a is an opening that is located at an upper end of the main water passage P1 and has a substantially rectangle shape along an inner surface (the side walls of the body portion 41 and the partition wall 44c) of the main water passage P1. The second opening 44b is an opening that is located at an upper end of the bypass water passage P2 and has a substantially circular shape.

The filter 45 for filtration is attached to the inside of the main water passage P1 of the body portion 41. As illustrated in FIGS. 4 and 6, a flange portion 45a projecting laterally is provided at an upper end of the filter 45. The flange portion 45a has a shape with which the flange portion 45a is accommodated in (placed on) the stepped portion at the peripheral edge of the first opening 44a. A capturing unit 45b with a bursiform shape (bottomed tubular shape) is provided at a lower portion of the flange portion 45a.

The capturing unit 45b is made of a mesh material, a non-woven cloth, or the like in which multiple finer pores than those of the strainer provided at the water inlet port of the inlet-side water passage are formed. The capturing unit 45b is configured with a side wall 45c extending in the up-down direction and a bottom wall 45d that shields the lower end of the side wall 45c. The capturing unit 45b has a square pyramid shape in which an inner area surrounded by the side wall 45c gradually decreases from the upper end side connected to the flange portion 45a toward the lower end side connected to the bottom wall 45d.

The filter 45 is inserted into the main water passage P1 through the first opening 44a with the bottom wall 45d located at the head. If a state in which the flange portion 45a is placed on the stepped portion of the first opening 44a (FIG. 4) is obtained, then further insertion of the filter 45 is restricted, and the position of the filter 45 relative to the body portion 41 is set. In this state, the bottom end of the partition wall 44c and the bottom wall 45d are located at substantially the same positions in the up-down direction (see FIG. 4). Therefore, the filter 45 does not reach the lower end side of the body portion 41 where the communication passage P3 is formed, and a flow passage directed to the exit tubular portion 41b from the bypass water passage P2 via the communication passage P3 is secured.

A pressure valve 46 is attached to the second opening 44b of the sealing member 44. The pressure valve 46 is a valve member including a constantly closed-type valve body that is ordinarily closed and opens and causes a fluid (cooling water) to pass therethrough when a predetermined or larger pressure is applied thereto. A flange portion 46a projecting laterally is provided at a casing outer surface of the pressure valve 46.

The pressure valve 46 is inserted from the upper side into the second opening 44b. If a state in which the flange portion 46a is placed on the stepped portion at the peripheral edge of the second opening 44b (FIG. 4) is obtained, then further insertion of the pressure valve 46 is restricted, and the position of the pressure valve 46 relative to the body portion 41 is set.

The lid portion 42 is attached to the body portion 41 in a state in which the sealing member 44, the filter 45, and the pressure valve 46 are assembled. The lid portion 42 has a side wall 42c extending downward from the peripheral edge of the upper wall 42a. The side wall 42c has a shape corresponding to the side walls of the body portion 41. The position of the lid portion 42 relative to the body portion 41 in the up-down direction is set by the lower end of the side wall 42c abutting on the flange portion 41h. The positions of the lid portion 42 relative to the body portion 41 in the front-back direction and in the left-right direction are set by the inner surface of the side wall 42c coming into contact with the outer surface of the side walls (a portion above the flange portion 41h) of the body portion 41.

As illustrated in FIG. 4, a stepped portion 42d directed downward is formed inside the side wall 42c. If the lid portion 42 is attached to the body portion 41, then the stepped portion 42d abuts on the sealing member 44 and then pressurizes and deforms the sealing member 44. The flange portion 45a and the flange portion 46a are sandwiched between each of the stepped portions of the first opening 44a and the second opening 44b on the side of the body portion 41 and the stepped portion 42d on the side of the lid portion 42 (see FIG. 4).

A pair of front and rear support projections 42e are provided at a front edge and a rear edge of the side wall 42c. As illustrated in FIG. 4, each support projection 42e has a hook shape bent upward near the distal end thereof. If the lid portion 42 is attached to the body portion 41, then the support projection 41i and the support projection 42e are brought into a relationship in which the support projection 41i and the support projection 42e are aligned in the up-down direction at a predetermined interval on each of the front side and the rear side.

The support projection 41i and the support projection 42e on the front side and the support projection 41i and the support projection 42e on the rear side are fastened, respectively, via fastening members 47. The fastening members 47 are made of elastic bodies such as rubber and have fitting holes 47a and fitting holes 47b at different positions in the up-down direction. The fastening members 47 are provided with tabs 47c extending upward from the locations where the fitting holes 47b on the upper side are formed.

In an initial state (a free state in which no deformation due to an external force has occurred) of each fastening member 47, the interval between the fitting hole 47a and the fitting hole 47b is set to be smaller than the interval between the support projection 41i (the proximal end-side portion except for the bent portion at the distal end) and the support projection 42e (the proximal end-side portion except for the bent portion at the distal end).

If the support projection 41i is inserted into the fitting hole 47a, the tab 47c is gripped, and the fastening member 47 is pulled upward, then the fastening member 47 is elastically deformed, and the interval between the fitting hole 47a and the fitting hole 47b increases. This enables the support projection 42e to be inserted into the fitting hole 47b, and it is possible to obtain a state in which the proximal end-side portions of the support projection 41i and the support projection 42e are fitted into the fitting hole 47a and the fitting hole 47b, respectively, as illustrated in FIG. 4. If the pulling of the fastening member 47 is released in this fitted state, then a bias force of attracting the support projection 42e to the support projection 41i works due to the fastening member 47 that is about to restore its original state from the elastically deformed state. Then, separation of the lid portion 42 from the body portion 41 to the upper side is restricted by the fastening member 47, and the lid portion 42 is secured to the body portion 41. The fastening member 47 in the fitted state is prevented from dropping on a side of the body portion 41 and the lid portion 42 by being hooked at the bent portions of the support projection 41i and the support projection 42e on the distal end sides. In other words, once the body portion 41 and the lid portion 42 are coupled to each other using the fastening members 47, the coupling between the body portion 41 and the lid portion 42 is maintained as long as the fastening members 47 are not intentionally detached therefrom.

The sealing member 44 sandwiched with the stepped portion 42d secures watertightness between the body portion 41 and the lid portion 42 secured with the fastening members 47. The pinching of the flange portion 45a and the flange portion 46a achieved by the stepped portion 42d is maintained by the lid portion 42 being secured to the body portion 41. In other words, the filter 45 and the pressure valve 46 are also secured at predetermined positions inside the filtration device 40 along with the securing of the lid portion 42. The filter 45 is secured at a position at which the capturing unit 45b is inserted into the main water passage P1, and the pressure valve 46 is secured at an upstream-side end portion of the bypass water passage P2.

The filtration device 40 has a longer length in the front-back direction than the width in the left-right direction. Therefore, it is possible to improve strength and stability of the securing by fastening the body portion 41 and the lid portion 42 via the fastening members 47 at the two locations on the front edge side and the rear edge side with a distance therebetween.

As illustrated in FIG. 4, if the lid portion 42 is attached to the body portion 41, then a flow-in space P4 surrounded by the inner surface of the lid portion 42 and the sealing member 44 is formed. The flow-in space P4 is located over both the main water passage P1 and the bypass water passage P2 on their upper side. Since the capturing unit 45b of the filter 45 has a shape projecting downward without shielding the first opening 44a, the main water passage P1 and the flow-in space P4 constantly communicate with each other, and the cooling water advancing from the flow-in space P4 to the main water passage P1 is not prevented. Partitioning between the bypass water passage P2 and the flow-in space P4 is achieved by the pressure valve 46, and the cooling water advancing from the flow-in space P4 to the bypass water passage P2 is restricted in a state in which the pressure valve 46 is closed. The cooling water is allowed to advance from the flow-in space P4 to the bypass water passage P2 only in a case in which a predetermined or larger pressure (water pressure) is applied on the side of the flow-in space P4 and the pressure valve 46 is opened. The cooling water that has flowed into the bypass water passage P2 advances from the lower side of the filter 45 to the exit tubular portion 41b through the communication passage P3 and is then discharged from the filtration device 40.

The filtration device 40 configured by combining each component as described above is attached to a midpoint of the cooling water route. As described above, the entrance tubular portion 42b is inserted into the end portion of the upper half portion of the up-down direction pipe portion 36d, and the exit tubular portion 41b is inserted into the end portion of the lower half portion of the up-down direction pipe portion 36d, thereby connecting the filtration device 40 to the water discharge hose 36. These connecting locations have watertightness due to a predetermined sealing structure. The pair of upper and lower fastening portions 41j are fastened to the fastening portions 13a of the cylinder head 13 using the bolts 43. Due to the fastening and securing, precision of the position of the filtration device 40 becomes stably high, and it is possible to prevent an application of an excessive load and a loss of watertightness at the portions where the exit tubular portion 41b and the entrance tubular portion 42b are connected to the water discharge hose 36.

The cooling water that has flowed into the filtration device 40 from the entrance tubular portion 42b on the upstream side advances from the flow-in space P4 to the main water passage P1, passes through the capturing unit 45b of the filter 45, and exits to the exit tubular portion 41b on the downstream side. Foreign matters that cannot pass through the mesh, the non-woven cloth, or the like of the capturing unit 45b from among the foreign matters contained in the cooling water that has flowed into the filtration device 40 are prevented from advancing on the downstream side and are then stored in the capturing unit 45b.

Examples of the foreign matters that remain in the cooling water and that are targets to be collected by the filtration device 40 include microplastics, in particular. Plastic pieces with sizes of 5 mm or less are typically called microplastics. The filter 45 in the filtration device 40 according to the present embodiment has a filtration function capable of capturing and collecting yet finer remaining foreign matters with sizes in a minimum level (of about 0.1 mm to 0.2 mm in general) in which the foreign matters are visible with naked eyes and can reliably collect microplastics.

For example, it is assumed that the mesh size of the strainer at the water inlet port is set such that passing of foreign matters with sizes of about 1 mm to 2 mm or more can be restricted in order to satisfy a condition that clogging is not to be caused inside the cooling water route. Although there is a likelihood that foreign matters smaller than the sizes enter the cooling water route through the mesh of the strainer, the risk of the foreign matters clogging inside the cooling water route is low, and there is thus no problem in terms of securing of cooling performance. However, if the fine foreign matters contained in the cooling water are released to the outside as they are without being collected, opportunities of collecting fine environment contaminating materials that cannot be captured by the strainer are missed.

In order to take advantage of such opportunities to carry out an environmental measure, the filtration device 40 capable of capturing the fine foreign matters that have entered the cooling water route without being captured by the strainer is provided in the cooling water route of the cooling device. It is thus possible to remove the fine environment contaminating materials such as microplastics contained in the cooling water taken from the outside in a state in which the engine 10 is driven and to return the cooling water, from which the environment contaminating materials have been removed, to the outside. Although it is generally difficult to collect the fine environment contaminating materials dispersed in water, the filtration device 40 is configured to capture the fine environment contaminating materials using the flow of the cooling water taken from the outside by focusing on the characteristic of the cooling device for a power source for a ship propulsion device of repeatedly taking cooling water from the outside (cruising water area) and discharging the cooling water. It is thus possible to efficiently and actively carry out an environmental measure with no need of special operations or control other than ordinary circulation of the cooling water during cruising of the ship using the engine 10 as a power source.

In an outboard motor with a large output and a large displacement capacity, in particular, the flow amount of cooling water taken into the cooling water route increases to have high cooling performance. In one example, an outboard motor with an engine displacement of more than 4000 cc and in an output level of 300 PS has performance of causing about 100 liters of cooling water to flow per minute (6000 liters per hour). It is thus possible to perform processing of removing environment contaminating materials from a large amount of cooling water in every cruising, by including the filtration device 40 in the cooling water route.

The filtration device 40 is disposed at a midpoint of the water discharge-side water passage 35 in the cooling water route. In the cooling water route, the water temperature of the cooling water flowing through the water discharge-side water passage 35 after heat is removed from the engine 10 in the cooling water passage 30 is higher than the water temperature of the cooling water until reaching the cooling water passage 30 after being pumped up from the outside to the inlet-side water passage. Since viscosity of warm water is lower than that of cold water, it is easy to cause the cooling water to flow without resistance regardless of the filter 45, by providing the filtration device 40 at the midpoint of the water discharge-side water passage 35 through which warm water flows. It is thus possible to efficiently capture the foreign matters such as microplastics.

Moreover, there is also a likelihood that trash and the like left inside the engine 10, in addition to the foreign matters originally contained in water from the outside of the outboard motor, is mixed in the cooling water passing through the water discharge-side water passage 35. The filter 45 of the filtration device 40 can also capture such foreign matters mixed at midpoints of the cooling water route. Therefore, the filtration device 40 is preferably provided in the water discharge-side water passage 35 on the downstream side in view of collection of the foreign matters left inside the engine 10 as well.

However, it is also possible to provide a filtration device like the filtration device 40 at a midpoint of the inlet-side water passage from the water inlet port to the cooling water passage 30 in the cooling water route.

The filtration device 40 can also collect substances in water other than microplastics. For example, aquafarmers who use fish cages can efficiently capture remaining feed and the like spread in water during aquafarming using the filtration device 40 and can contribute to prevention of marine contamination by cruising around the fish cages in a ship using the engine 10 as a power source.

In a state in which the cooling water is smoothly flowing on the side of the main water passage P1 in the filtration device 40, the pressure (water pressure) inside the flow-in space P4 does not increase, and the pressure valve 46 of the constantly closed-type maintains the closed state. Therefore, since a flow of the cooling water passing through the bypass water passage P2 does not occur, and the total amount of cooling water passes through the filter 45, and the filter 45 does not miss the foreign matters to be collected.

If the amount of foreign matters captured by the filter 45 increases, and clogging occurs, then the flow of the cooling water in the main water passage P1 is disrupted, and the pressure (water pressure) in the flow-in space P4 increases. In a case in which the pressure in the flow-in space P4 is greater than a predetermined value, the pressure valve 46 is opened, and the cooling water starts to flow through the bypass water passage P2. Then, the cooling water flows downwards from the filtration device 40 through the bypass water passage P2 and the communication passage P3. In this manner, it is possible to automatically select the main water passage P1 and the bypass water passage P2 of the filtration device 40 in accordance with a situation, to cause the cooling water to flow from the upstream side to the downstream side with no problems, and to prevent the cooling performance of the engine 10 from deteriorating due to a circulation failure of the cooling water regardless of the amount of foreign matters captured by the filter 45.

As illustrated in FIG. 4, the exit tubular portion 41*b* and the entrance tubular portion 42*b* are located above and below the main water passage P1, respectively. In other words, the main water passage P1 is located on the center line of the up-down direction pipe portion 36*d* (on the linear flow passage directed in the up-down direction). On the other hand, the bypass water passage P2 is at a location offset backward from the center line of the up-down direction pipe portion 36*d*. Therefore, the cooling water entering the filtration device 40 dominantly flows from the flow-in space P4 to the main water passage P1, and it is possible to efficiently cause the cooling water to pass through a linear route in the filtration device 40 in a state in which no clogging of the filter 45 has occurred in the main water passage P1.

The capturing unit 45*b* of the filter 45 has a narrowed shape in which the inner area surrounded by the side wall 45*c* decreases toward the lower side. Therefore, in a case in which the captured foreign matters are sequentially accumulated in the capturing unit 45*b* from the lower end (bottom wall 45*d*) side, a gap through which the cooling water is caused to flow is secured between the inner surface of the main water passage P1 and the capturing unit 45*b* above the accumulated foreign matters, and clogging of the filter 45 is unlikely to occur in the main water passage P1. In other words, the advancing of the cooling water in the main water passage P1 is unlikely to be prevented until a state in which a most part of the capturing unit 45*b* is filled with foreign matters is achieved, and it is possible to efficiently capture foreign matters with a low replacement frequency of the filter 45.

Occurrence of clogging of the filter 45 is detected by a pressure sensor 51 (schematically illustrated in FIG. 2) installed on the upstream side beyond the filtration device 40 in the water discharge-side water passage 35, for example. A signal from the pressure sensor 51 is transmitted to a control unit 50 (schematically illustrated in FIG. 2) mounted in the outboard motor or the ship. If clogging of the filter 45 occurs, then the water pressure in the water discharge-side water passage 35 rises on the upstream side beyond the filtration device 40.

Although the flow of the cooling water via the bypass water passage P2 in the filtration device 40 is secured and the cooling performance is thus not degraded even in a state in which clogging of the filter 45 has occurred, the water pressure in the flow-in space P4 temporarily rises until the pressure valve 46 is opened. The pressure sensor 51 can detect the influence of the rise of the water pressure.

In a case in which the detection value of the pressure sensor 51 is greater than a predetermined value, the control unit 50 determines that clogging has occurred in the filter 45 and causes an alert notification to be issued for the crew (ship operator). As a notification means, display (visual recognition) on a display device 52 such as a gauge for ship operating or a display light on an outer surface of the outboard motor or alert sound or voice generated from a speaker 53 is used. Also, a notification means other than these may be used. For example, a signal for notification may be transmitted to a mobile information terminal that the crew carries.

Note that an engine temperature alert based on a detection value of a water temperature sensor that measures the water temperature of the cooling water may be provided along with the clogging alert based on the detection value of the pressure sensor 51, in order to more reliably prevent overheating of the engine 10.

In a case in which clogging of the filter 45 is reported or a predetermined maintenance cycle elapses, an operator performs an operation of removing the collected materials from the filtration device 40. If the filtration device 40 is detached from the engine 10, fastening with the fastening members 47 is released, and the lid portion 42 is detached from the body portion 41, then the filter 45 is exposed and can be pulled out as in FIG. 6. Then, the filter 45 is replaced, and the filtration device 40 is assembled again and is then attached to the up-down direction pipe portion 36d of the water discharge hose 36. For the replacement of the filter 45, the filter 45 from which the collected materials have been removed may be attached again, or the filter 45 may be replaced with a new filter 45. Alternatively, it is also possible to replace the entire filtration device 40 with a new one.

The filtration device 40 is of a self-contained cartridge type incorporating the filter 45 and the pressure valve 46 and having a function of collecting foreign matters remaining in the main water passage P1 and a function of securing the flow path with the bypass water passage P2. Therefore, it is possible to mount the filtration device 40 without applying any large-scaled modifications to the existing cooling device. Also, it is possible to attach and detach only the portion corresponding to the filtration device 40 without requiring large-scaled disassembly of the cooling device and to easily perform a maintenance operation such as filter replacement.

The filtration device 40 as a unit can be easily detached from the engine 10 by releasing the securing with the bolts 43 and pulling the exit tubular portion 41b and the entrance tubular portion 42b from the up-down direction pipe portion 36d of the water discharge hose 36.

For the disassembly of the filtration device 40, the fastening members 47 are elastically deformed, the fitting hole 47b is pulled out of the support projection 42e, and the securing of the lid portion 42 is released, by inclining the tab 47c on a side (in the front-back direction) of the body portion 41 while gripping the tab 47c and pulling the tab 47c upward. In a state in which the lid portion 42 has been detached, it is possible to easily pull the filter 45 upward out of the body portion 41 (first opening 44a). Similar to the filter 45, it is also possible to easily detach the pressure valve 46 by pulling the pressure valve 46 upward out of the body portion 41 (second opening 44b) as needed. Therefore, it is possible for the operator to easily perform detachment and replacement of the filter 45 and the pressure valve 46 without requiring special tools, skills, and the like. Particularly, it is possible to manually perform operations up to detachment of the filter 45 and the pressure valve 46 for the filtration device 40 after being detached from the engine 10.

When the filtration device 40 is assembled, watertightness is obtained between the body portion 41 and the lid portion 42 with the sealing member 44 sandwiched therebetween, by the lid portion 42 being secured to the body portion 41 using the fastening members 47. Also, the filter 45 and the pressure valve 46 are secured to each other with the flange portion 45a and the flange portion 46a sandwiched between the sealing member 44 (the stepped portion in the surroundings of the first opening 44a and the second opening 44b) and the stepped portion 42d of the lid portion 42. Therefore, it is possible to provide a watertight structure to the filtration device 40, to complete the securing of the filter 45 and the pressure valve 46, and to assemble the filtration device 40 of the cartridge type with no time and efforts, merely by attaching the lid portion 42 to the body portion 41.

In the filtration device 40, the partition wall 44c that is a part of the sealing member 44 that establishes sealing between the body portion 41 and the lid portion 42 is used to partition the inside of the body portion 41 into the main water passage P1 and the bypass water passage P2. Therefore, it is possible to simplify the structure of the body portion 41 and thereby to reduce manufacturing costs and times and efforts for manufacturing.

As described above, it is possible to perform an environmental measure activity at the same time during an ordinary operation of the engine 10 by including the filtration device 40 in the cooling water route. Since the filtration device 40 is provided with the bypass water passage P2, the flow of the cooling water is not inhibited even in a situation in which clogging of the filter 45 occurs, and the power performance of the engine 10 is not sacrificed. Also, since it is only necessary to provide the filtration device 40 of a cartridge type with a simple configuration, for which maintenance can be easily performed, without any addition of complicated devices, it is possible to realize an environmental measure activity at low costs while keeping the cooling device in a compact size.

As described above, the engine 10 has a wide width in the left-right direction in the front area E1 where the cylinders 15, the combustion chamber 18, the intake port 19, and the exhaust port 20 are formed (see FIG. 3). Particularly, since the exhaust conduit line 22 requires a large volume to incorporate the catalyst 23, and the exhaust surrounding water passage 34 of the cooling water passage 30 surrounds the surroundings of the exhaust conduit line 22, a necessary space is likely to increase on the right side of the front area E1. Although the amount of the engine 10 projecting on the right side is minimized by forming the exhaust conduit line 22 and the catalyst 23 into elongated shapes extending in the up-down direction, a portion near the exhaust conduit line 22 is a portion at which the engine 10 has the maximum width in the left-right direction (see FIGS. 1 and 3). On the other hand, since the rear area E2 behind the area includes only the left and right valve operating chambers 24, the engine 10 has a narrow width in the left-right direction as compared with the front area E1 (see FIG. 3).

The up-down direction pipe portion 36d in the water discharge-side water passage 35 extends in the up-down direction with the up-down direction pipe portion 36d located behind the exhaust conduit line 22 and the exhaust surrounding water passage 34 included in the front area E1 and disposed on a side (right side) of the valve operating chambers 24 included in the rear area E2. In accordance with this configuration, the filtration device 40 attached to the midpoint of the up-down direction pipe portion 36d is configured to have a columnar shape (square tubular shape) that is elongated in the up-down direction and is accommodated in a space with a stepped shape between the front area E1 and the rear area E2. Highly dense component disposition with no waste of space is realized by disposing the catalyst 23 and the filtration device 40, each of which is elongated in the up-down direction, in an aligned manner in the front-back direction. Therefore, the filtration device 40 is disposed with satisfactory space efficiency using structures around the engine 10 including an exhaust system, and it is possible to secure an internal volume for collecting foreign matters while preventing the outboard motor from increasing in size.

As a problem specific to an outboard motor, there is a requirement for minimizing the lateral width of each outboard motor on the assumption of a case of employing multiple-machine arrangement in which a plurality of outboard motors are attached in an aligned manner. The outboard motor generally has the widest width at the portion corresponding to the engine, in particular, and it is important to reduce the lateral width around the engine as much as possible. As illustrated in FIG. 3, the engine case 11 is set to have a shape in which the width in the left-right direction is gradually narrowed from a portion near the center of the outboard motor in the front-back direction toward the rear side in a manner corresponding to the engine 10 with a narrower width in the left-right direction in the rear area E2 than in the front area E1. In this manner, the lateral width around the engine is reduced to the minimum limit as a whole including not only the engine 10 but also the engine case 11.

As illustrated in FIG. 3, the filtration device 40 has a configuration in which the main water passage P1 and the bypass water passage P2 are aligned in the front-back direction. In this manner, the width of the filtration device 40 in the left-right direction is curbed. Moreover, the filtration device 40 has a substantially triangular shape (wedge shape) that is wide in the left-right direction on the front (front-side wall 41c) side and is narrow in the left-right direction on the rear (rear-side wall 41f) side in a plan view. More specifically, the side wall on the right side (right-side wall 41e) directed to the outside of the outboard motor in the filtration device 40 has a shape inclined to be close to the center of the outboard motor in the left-right direction from the front side toward the rear side. In this manner, the accommodation of the filtration device 40 in the space on the right and rear side of the engine 10 is realized without affecting the shape (the outer surface shape of the outboard motor) of the engine case 11 with a width in the left-right direction narrowed to be smaller on the rear side, that is, without increasing the outboard motor in size in the left-right direction. Since the filter 45 is disposed in the main water passage P1 on the front side on which the width in the left-right direction is larger in the filtration device 40, it is possible to secure the volume of the filter 45 to increase the amount of foreign matters to be collected and thereby to reduce the replacement frequency of the filter 45.

As described above, the filtration device 40 of the cartridge type can have dedicated design in which filtration performance, space efficiency, disposition relationships with other components, and the like are optimized for each model of the power source for the ship propulsion device. Moreover, since the filtration device 40 of the cartridge type can be easily attached and detached to and from the inside of the cooling water route and has a self-contained property of automatically performing from collection of foreign matters to securing of a flow path at the time of clogging of the filter in an attached state, there are less influences on layout and functionality of the entire cooling device. For example, it is also easy to mount the filtration device 40 later to an existing cooling device that is not provided with a filtration function therein.

Figure 7:
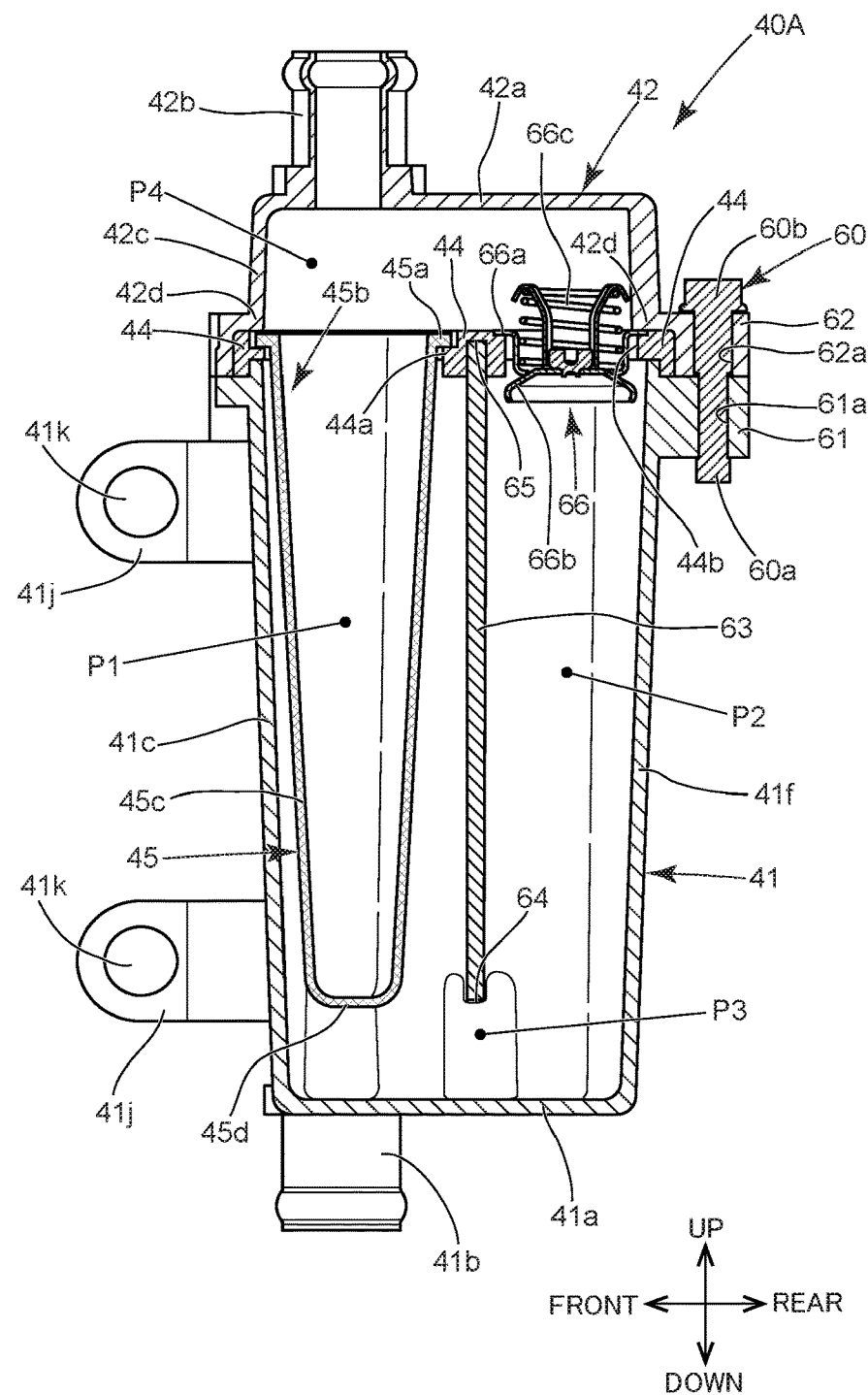
FIG. 7 is a cross-sectional view of the filtration device of a first modification.

FIG. 7 illustrates a filtration device 40A according to a first modification example. Components of the filtration device 40A common to those in the aforementioned filtration device 40 will be indicated with the same reference signs, and description will be omitted.

The filtration device 40A is different in a means for securing the lid portion 42 to the body portion 41, and the lid portion 42 is secured to the body portion 41 through fastening using a bolt 60. A fastening portion 61 and a fastening portion 62 projecting laterally are provided near the upper end of the body portion 41 and near the lower end of the lid portion 42, respectively. A screw hole 61a penetrating in the up-down direction is formed in the fastening portion 61 of the body portion 41. A through-hole 62a penetrating in the up-down direction is formed in the fastening portion 62 of the lid portion 42. The bolt 60 has a shaft portion 60a having a male screw on an outer surface thereof and a large-diameter head portion 60b located at an end portion of the shaft portion 60a.

If the body portion 41 is covered with the lid portion 42, then the screw hole 61a and the through-hole 62a are brought into a relationship in which the screw hole 61a and the through-hole 62a are aligned in the up-down direction. The shaft portion 60a of the bolt 60 is inserted from the upper side into the through-hole 62a and is then screwed into the screw hole 61a. If a predetermined fastening torque is applied in a state in which the head portion 60b abuts on the upper surface of the fastening portion 62, then the lid portion 42 is secured to the body portion 41.

The securing achieved using the bolt 60 enables the lid portion 42 to be more strongly secured to the body portion 41. Therefore, the securing is effective in a case in which a high water pressure is applied to the inside of the filtration device 40A.

Note that although the securing achieved using the bolt 60 is illustrated only at one location in the sectional position in FIG. 7, the securing achieved using the bolt 60 is performed at a plurality of locations in order to secure high watertightness in the filtration device 40A. Preferably, the securing is performed at three or more locations. For example, securing on the side of the rear-side wall 41f where the width of the filtration device 40A in the left-right direction is minimum is performed with a bolt 60 at one location as illustrated in FIG. 7. Securing achieved using the bolt 60 at the remaining two locations is performed near both left and right ends of the front-side wall 41c where the width in the left-right direction is wide. In other words, a structure in which the securing achieved using the bolt 60 is performed near three corners of the filtration device 40 with a substantially triangular shape in a plan view is employed. Such setting of the three securing locations causes no localization of a load and is thus effective to secure securing stability and water-tightness of the lid portion 42 with respect to the body portion 41.

A partition wall plate 63 that is a member which is different from any of the body portion 41, the lid portion 42, and the sealing member 44 establishes partitioning between the main water passage P1 and the bypass water passage P2 in the filtration device 40A. A groove portion 64 into which the edge portion in the left-right direction of the partition wall plate 63 on the lower end side is inserted is formed in the inner surface of the body portion 41. A groove portion 65 into which the partition wall plate 63 on the upper end side is inserted is formed in the sealing member 44. If the sealing member 44 is attached to the body portion 41 in a state in which the partition wall plate 63 is inserted into the groove portion 64, then the upper end of the partition wall plate 63 is fitted to the groove portion 65, and the partition wall plate 63 is secured.

Since the groove portion 64 is formed inside the body portion 41, the inner structure of the body portion 41 becomes simpler, and it is possible to form the body portion 41 at lower costs and with higher precision as compared with a case in which the partitioning structure like the partition wall plate 63 is integrally formed inside the body portion 41. Moreover, since it is only necessary to insert the partition wall plate 63 into the groove portion 64 and to then attach the lid portion 42, it is possible to establish the partitioning between the main water passage P1 and the bypass water passage P2 with a simple operation.

Although a pressure valve 66 that is a valve member in the filtration device 40A has a shape different from that of the pressure valve 46 in the aforementioned filtration device 40, the pressure valve 66 has similar functions. The supporting structure that a flange portion 66a is sandwiched with the stepped portion 42d of the lid portion 42 and the pressure valve 66 is then secured is also common.

The pressure valve 66 includes a valve body 66b that can move upward and downward relative to the flange portion 66a, and the valve body 66b is biased in a closed direction (the upper side in FIG. 7) by a compression spring 66c. FIG. 7 illustrates a state in which the pressure valve 66 is closed. If the pressure (water pressure) in the flow-in space P4 becomes greater than a predetermined value, then the valve body 66b is pressed down against the bias force of the compression spring 66c, and the cooling water flows to the bypass water passage P2.

Figure 8:
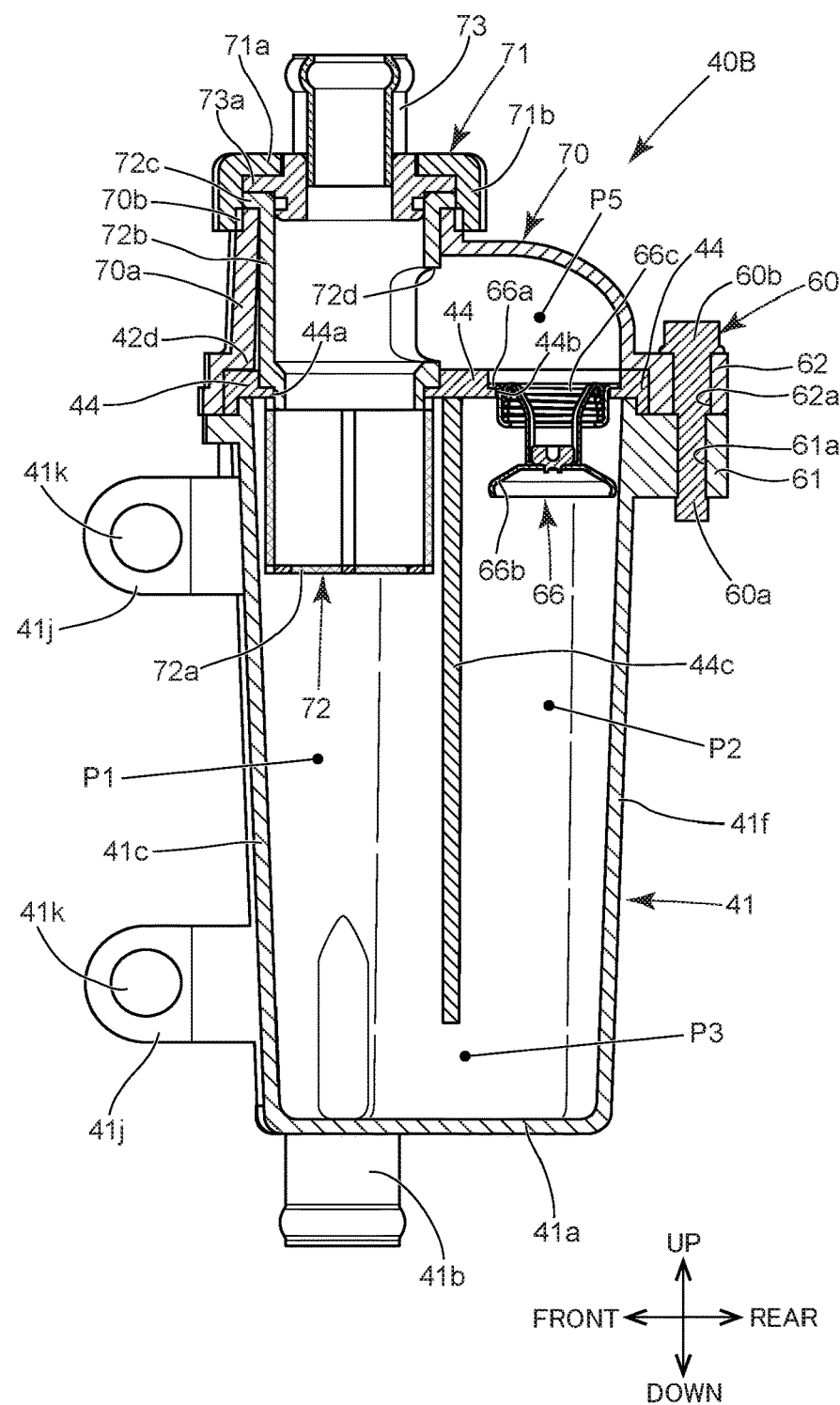
FIG. 8 is a cross-sectional view of the filtration device of a second modification.

FIG. 8 illustrates a filtration device 40B according to a second modification example. Components of the filtration device 40B common to those in the aforementioned filtration device 40 and filtration device 40A will be indicated with the same reference signs, and description will be omitted.

The filtration device 40B is common to the filtration device 40A in that the bolt 60 is used to secure a first lid portion 70 to the body portion 41. The number of locations where securing is achieved by the bolt 60 and suitable disposition of the securing locations are similar to those of the filtration device 40A. The pressure valve 66 is similar to that in the filtration device 40A. FIG. 8 illustrates a state in which the pressure valve 66 is opened.

The filtration device 40B includes a second lid portion 71 that can be attached to and detached from the first lid portion 70, separately from the first lid portion 70. Attachment and detachment of the filter 72 are performed by detaching the second lid portion 71 from the first lid portion 70 and do not require detachment of the first lid portion 70 from the body portion 41.

More specifically, the first lid portion 70 has a cylindrical support tubular portion 70a located above the main water passage P1 and extending in the up-down direction. A screw 70b is formed on the outer surface of the support tubular portion 70a near the upper end thereof.

The second lid portion 71 has a disc-shaped upper wall 71a and a cylindrical side wall 71b extending downward from the peripheral edge of the upper wall 71a, and a female screw fitted onto the screw 70b is formed on the inner surface of the side wall 71b.

An entrance tubular portion 73 projects upward from the upper wall 71a of the second lid portion 71. An end portion of the upper half portion of the up-down direction pipe portion 36d of the water discharge hose 36 is connected to the entrance tubular portion 73. The inlet tubular portion 73 penetrates through the upper wall 71a, and a flange portion 73a located inside the second lid portion 71 and abutting on the upper wall 71a from the lower side is formed at a lower end of the inlet tubular portion 73.

The filter 72 includes, at a lower portion, a bottomed cylindrical capturing unit 72a made of a porous mesh material, and a supported tubular portion 72b projects upward from the capturing unit 72a. Note that the capturing unit 72a can also have a configuration obtained by attaching a non-woven cloth or the like to a skeleton. The capturing unit 72a corresponds to the capturing unit 45b in the aforementioned filter 45 and has the same functions as those of the capturing unit 45b although the shapes are different. A flange portion 72c projecting laterally is provided at the upper end of the supported tubular portion 72b. A side opening 72d penetrating laterally is formed in the supported tubular portion 72b.

When the filtration device 40B is assembled, the filter 72 is inserted into the body portion 41 and the first lid portion 70 with the capturing unit 72a located at the head in a state in which the second lid portion 71 is detached from the support tubular portion 70a of the first lid portion 70. If the flange portion 72c abuts on the upper end of the support tubular portion 70a, then further insertion of the filter 72 is restricted. In this stage, the outer surface of the supported tubular portion 72b comes into contact with the inner surface of the support tubular portion 70a, and moving of the filter 72 in the front-back direction and the left-right direction is restricted. Also, the capturing unit 72a is located inside the main water passage P1.

A flow-in space P5 is formed above the bypass water passage P2 in the first lid portion 70. The position of the filter 72 in a rotational direction around an axis of the support tubular portion 70a is set such that a side opening 72d communicates with the flow-in space P5. Note that a structure for setting the position in the rotational direction may be included between the first lid portion 70 and the filter 72 such that the filter 72 can be inserted into the support tubular portion 70a only at a specific position in the rotational direction illustrated in FIG. 8. In one example, it is possible to set the position of the filter 72 in the rotational direction at the time of attachment by providing a key groove extending in the up-down direction and a key projection to be inserted into the key groove on one and the other one of the inner surface of the support tubular portion 70a and the outer surface of the supported tubular portion 72b.

The second lid portion 71 is attached to the support tubular portion 70a in a state in which the filter 72 is attached. With the attachment of the second lid portion 71, the flange portion 73a of the entrance tubular portion 73 abuts on the flange portion 72c of the filter 72 from the upper side. If the second lid portion 71 is caused to rotate and the amount of screwing to the screw 70b is caused to increase (the screw is fastened) in this state, the flange portion 72c is sandwiched between the upper end of the support tubular portion 70a and the flange portion 73a of the entrance tubular portion 73, and the filter 72 is then secured. The fastening of the second lid portion 71 can be manually performed.

In the filtration device 40B assembled as described above, in a state in which the filter 72 is not clogged, a flow of the cooling water that has flowed from the entrance tubular portion 73 on the upstream side advancing to the main water passage P1 through the capturing unit 72a of the filter 72 becomes dominant, and foreign matters contained in the cooling water are efficiently collected by the capturing unit 72a. If clogging occurs in the filter 72, then the cooling water flows from the side opening 72d to the flow-in space P5, the valve body 66b of the pressure valve 66 is opened due to pressure, and the cooling water is discharged from the filtration device 40B to the downstream side via the bypass water passage P2.

When the filter 72 that has caused clogging is replaced, the screwing to the screw 70b is released, and the second lid portion 71 is detached from the support tubular portion 70a. In this manner, the pressing against the flange portion 72c is released, and it is thus possible to pull out the filter 72 to the upper side.

As described above, the filtration device 40B has a two-stage lid structure including the first lid portion 70 secured to the body portion 41 with the bolt 60 and the second lid portion 71 that can be attached and detached through a rotating operation performed on the first lid portion 70, and the securing of the filter 72 is achieved by the second lid portion 71. Therefore, it is possible to easily replace the filter 72 without detaching the first lid portion 70 strongly secured with the bolt 60, and the operation is not complicated even in a case in which the replacement of the filter 72 is performed at a relatively high frequency.

On the other hand, high watertight performance is secured by the first lid portion 70 strongly secured with the bolt 60 in the surroundings of the sealing member 44 and the pressure valve 66. The replacement of the pressure valve 66 and the sealing member 44 and other maintenance can be performed by detaching the first lid portion 70. Since these operations are assumed to be performed at lower frequencies than that of the replacement of the filter 72, there is no need to frequently detach the first lid portion 70.

Although the present invention has been described above on the basis of the embodiment, the present invention is not limited to the aforementioned embodiment and modification examples and can be implemented with various modifications. The sizes, the shapes, and the like illustrated in the accompanying drawings in the aforementioned embodiment are not limited thereto and can be appropriately modified within a scope in which the effects of the present invention are achieved. In addition, the present invention can be implemented with appropriate modifications without departing from the scope of the object of the present invention.

Although the aforementioned embodiment has been applied to the outboard motor as an example of the ship propulsion device, the target of application of the present invention is not limited to the outboard motor, and the present invention can be applied generally to ship propulsion devices including a type disposed inside a ship (hull).

Although the engine that is an internal combustion engine is used as a power source for a ship propulsion device (outboard motor) in the aforementioned embodiment, it is also possible to apply the present invention to a ship propulsion device including a power source of another type, such as an electric motor. In other words, the present invention can be applied to any ship propulsion device as long as cooling of a power source is performed by a water cooling-type cooling device.

Although foreign matters in a level that causes clogging of the cooling water route are removed by the strainer provided at the water inlet port of the cooling water route in the aforementioned embodiment, it is also possible to cause the water inlet port itself to have a porous structure of a set of small pores instead of the provision of the strainer.

The cooling device for a power source for a ship propulsion device according to the present invention can collect environment contaminating materials such as microplastic that are present in water and efficiently remove the environment contaminating materials with a simple configuration with no sacrifice of power performance, and is particularly useful for a ship propulsion device with a high output that pumps a large amount of cooling water with the cooling device.

REFERENCE SIGNS LIST

10 Engine (power source)
11 Engine case
12 Cylinder block
13 Cylinder head
14 Head cover
15 Cylinder
16 Piston
18 Combustion chamber
19 Intake port
20 Exhaust port
22 Exhaust conduit line
23 Catalyst
24 Valve operating chamber
25 Intake camshaft
26 Exhaust camshaft
27 Intake valve
28 Exhaust valve
30 Cooling water passage
33 Cylinder surrounding water passage
34 Exhaust surrounding water passage
35 Water discharge-side water passage
36 Water discharge hose
36d Up-down direction pipe portion
37 Lower water discharge conduit line
40 Filtration device
40A Filtration device
40B Filtration device
41 Body portion
42 Lid portion
44 Sealing member
44c Partition wall
45 Filter
45b Capturing unit
46 Pressure valve (valve member)
47 Fastening member
52 Display device (notification means)
53 Speaker (notification means)
60 Bolt
63 Partition wall plate
66 Pressure valve (valve member)
70 First lid portion
71 Second lid portion
72 Filter
72a Capturing unit
P1 Main water passage
P2 Bypass water passage
P3 Communication passage
P4 Flow-in space
P5 Flow-in space

What is claimed is:
1. A cooling device for a power source for a ship propulsion device comprising:

a cooling water route that supplies water pumped up from underwater to a cooling water passage to cool the power source and discharges cooling water after the coding from the cooling water passage to outside, foreign matters with sizes that cause clogging of the cooling water route having been removed from the cooling water flowing through the cooling water route; and a filtration device that is provided in the cooling water route to filtrate foreign matters remaining in the cooling water, wherein the filtration device comprises a cartridge-type filtration device, wherein the filtration device is configured to incorporates a filter for filtration disposed in a main water passage and a valve member configured to open and close a bypass water passage, and wherein the filtration device, when clogging occurs therein during the power source been being cooled, is configured to open the valve member opens to cause the cooling water to flow, via the bypass water passage, from the upstream side to the downstream side of the cooling water route.

2. The cooling device for a power source for a ship propulsion device according to claim 1, wherein the filtration device has a columnar shape extending in a direction in which the cooling water flows and has a split structure including a body portion that has the main water passage and the bypass water passage and a lid portion that is able to be attached to and detached from the body portion.

3. The cooling device for a power source for a ship propulsion device according to claim 2, wherein the valve member is disposed at an upstream-side end portion of the bypass water passage of the body portion, and the valve member is secured with the lid portion pressing the valve member.

4. The cooling device for a power source for a ship propulsion device according to claim 2, wherein the body portion and the lid portion are secured to each other with a fastening member made of an elastic body or a bolt.

5. The cooling device for a power source for a ship propulsion device according to claim 1, wherein the ship propulsion device is an outboard motor, and the filtration device has a substantially triangular shape with a narrow width on a rear side and a wide width on a front side in a plan view state of the outboard motor.

6. The cooling device for a power source for a ship propulsion device according to claim 1, wherein the ship propulsion device is an outboard motor in which the power source is an internal combustion engine, and an exhaust conduit line of the internal combustion engine is provided with a catalyst, and the catalyst and the filtration device are disposed in an aligned manner in a front-back direction.

7. The cooling device for a power source for a ship propulsion device according to claim 1, wherein in a case in which clogging occurs in the filter, a notification means provides a notification using display or sound.

8. The cooling device for a power source for a ship propulsion device according to claim 1, wherein the filtration device has a filtration function with which remaining foreign matters with minimum visible sizes are able to be captured by the filter.

9. The cooling device for a power source for a ship propulsion device according to claim 1, wherein the filtration device is provided at a midpoint of a water discharge-side water passage from the cooling water passage to a water discharge port in the cooling water route.

* * * * *